(12) United States Patent
Mu

(10) Patent No.: US 8,234,544 B2
(45) Date of Patent: Jul. 31, 2012

(54) DATA ACCESS APPARATUS AND DATA ACCESS METHOD

(75) Inventor: Chung-Su Mu, Hsinchu (TW)

(73) Assignees: Silicon Motion Inc., keji Chuangyeyuan, Tianan Digital, Futian, Shenzhen, Guangdong (CN); Silicon Motion Inc., Jhubei, Hsinchu County (TW)

( * ) Notice: Subject to any disclaimer, the term of this patent is extended or adjusted under 35 U.S.C. 154(b) by 407 days.

(21) Appl. No.: 12/575,482

(22) Filed: Oct. 8, 2009

(65) Prior Publication Data

US 2010/0287433 A1    Nov. 11, 2010

(30) Foreign Application Priority Data

May 6, 2009  (TW) ................................ 98114961 A

(51) Int. Cl.
*G11C 29/00* (2006.01)
(52) U.S. Cl. ....... 714/766; 714/6.23; 714/704; 714/763; 714/800

(58) Field of Classification Search ................. 714/6.23, 714/766, 704, 763, 800
See application file for complete search history.

(56) References Cited

U.S. PATENT DOCUMENTS

| | | | |
|---|---|---|---|
| 6,820,182 B1* | 11/2004 | Bauman et al. ............... 711/170 |
| 7,996,720 B2* | 8/2011 | Jung et al. ...................... 714/36 |
| 8,060,774 B2* | 11/2011 | Smith et al. .................. 714/5.11 |
| 8,090,980 B2* | 1/2012 | Danilak ...................... 714/6.22 |
| 2005/0122790 A1* | 6/2005 | Ueno et al. ............... 365/189.05 |
| 2006/0198202 A1* | 9/2006 | Erez .......................... 365/185.29 |
| 2006/0288177 A1* | 12/2006 | Shaw ............................ 711/162 |
| 2008/0140961 A1* | 6/2008 | Atherton et al. .............. 711/162 |
| 2009/0150721 A1* | 6/2009 | Kochar et al. .................... 714/6 |
| 2009/0172335 A1* | 7/2009 | Kulkarni et al. ............... 711/170 |

* cited by examiner

*Primary Examiner* — Charles Ehne
(74) *Attorney, Agent, or Firm* — Winston Hsu; Scott Margo

(57) ABSTRACT

A data access apparatus includes: a flash memory controller; a mirror means; and a flash memory including at least one data region and at least one mirror region. The mirror means copies data to form mirror data to the mirror region when the flash controller writes the data into the data region. The flash memory controller reads the mirror data to replace the data if the flash memory controller determines that the data include error(s) while the data are being read.

5 Claims, 3 Drawing Sheets

DATA ACCESS APPARATUS AND DATA ACCESS METHOD

BACKGROUND OF THE INVENTION

1. Field of the Invention

The present invention relates to a data access apparatus, and more particularly, to a data access apparatus utilizing a mirror mechanism for increasing data access speed and ensuring data correctness.

2. Description of the Prior Art

Conventionally, data stored in a storage apparatus are protected by error correction codes (ECC). For example, data stored in a storage apparatus can be corrected by a corresponding ECC when the data are found to contain errors. However, the ECC utilized for error-correction has some limitations. For example, the ECC cannot be used for correcting errors included in data when the number of errors in the data is larger than a specific value (e.g. N bits). In many modern electronic devices, conventional hard disks are replaced by storage devices (e.g. flash memory) with faster access speed, and using the ECC for error correction is time-consuming. ECC is therefore unable to meet the requirements of fast access in modern electronic devices.

SUMMARY OF THE INVENTION

Therefore, one of the objectives of the present invention is to provide a data access apparatus, to increase data access speed and provide improved data correctness.

According to one embodiment of the present invention, a data access apparatus is disclosed. The data access apparatus includes: a flash memory controller; a mirror means; and a flash memory including at least one data region and at least one mirror region. The mirror means copies data to form mirror data to the mirror region when the flash controller writes the data into the data region. The flash memory controller reads the mirror data to replace the data if the flash memory controller determines that the data include error(s) while the data are being read.

According to another embodiment of the present invention, a data access apparatus is disclosed. The data access apparatus includes: a flash memory controller; a mirror means; a first flash memory including at least one data region; and a second flash memory including at least one mirror region for use by the first flash memory. The mirror means copies data to form mirror data to the mirror region when the flash controller writes the data into the data region. The flash memory controller reads the mirror data to replace the data if the flash memory controller determines that the data include error(s) while the data are being read.

According to yet another embodiment of the present invention, a data access apparatus is disclosed. The data access apparatus includes: a flash memory controller; a mirror means; a first flash memory; a second flash memory including at least one data region; and a third flash memory including at least one mirror region for use in the second flash memory. The mirror means copies data to form mirror data to the mirror region when the flash controller writes the data into the second flash memory. The flash memory controller reads the mirror data to replace the data if the flash memory controller determines that the data include error(s) while the data are being read.

As a person skilled in the art can readily understand the related data access method after reading the above embodiments, so further description is omitted here for brevity.

The above embodiments perform error-correction operations without utilizing the ECC, so the access speed of the flash memory can be increased and the data can be stored in the mirror region to improve the data correctness, thereby solving the above-mentioned problems.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
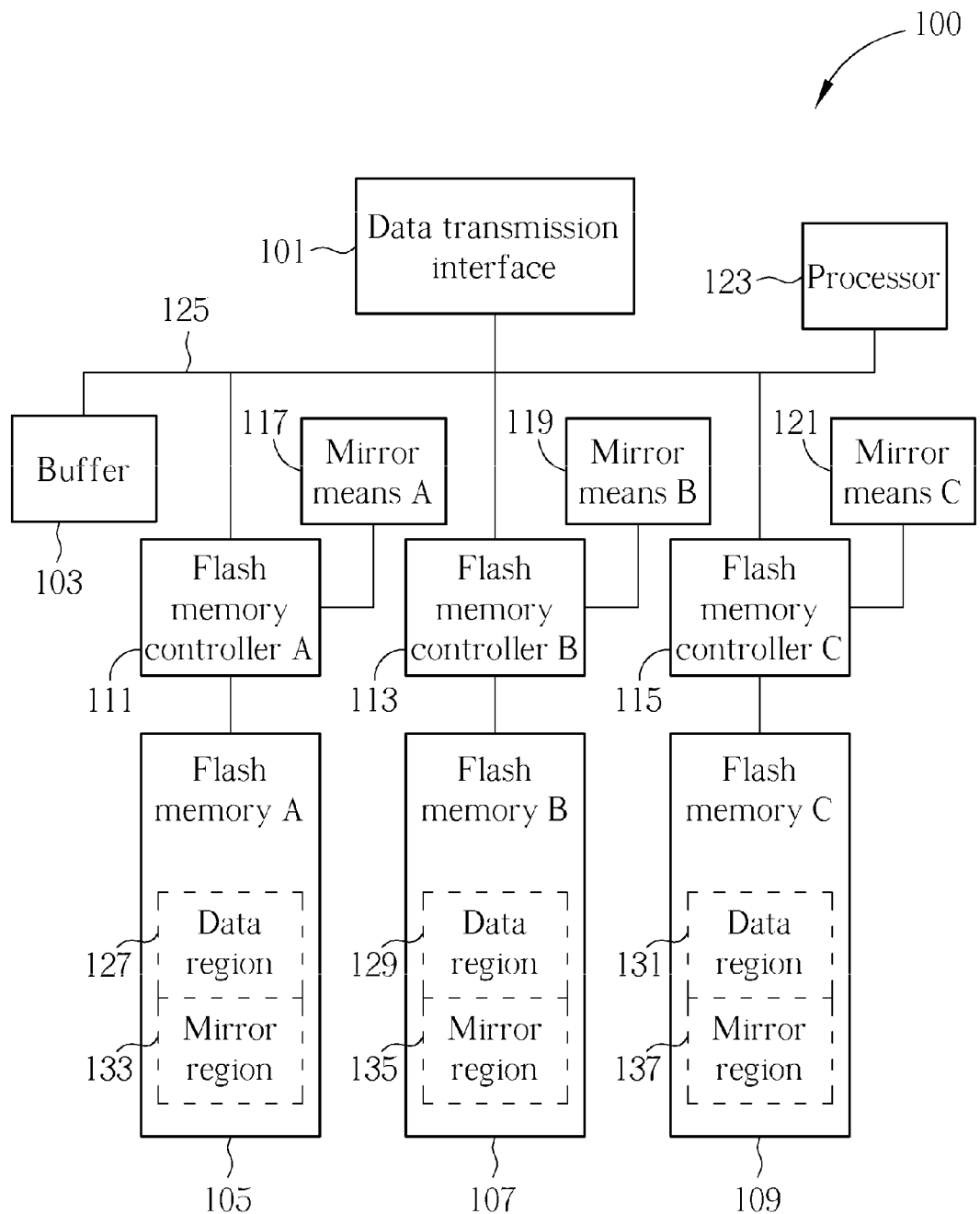
FIG. 1 is a diagram illustrating a data access apparatus according to one exemplary embodiment of the present invention.

FIG. 1 is a diagram illustrating a data access apparatus 100 according to an exemplary embodiment of the present invention. As shown in FIG. 1, the data access apparatus 100 includes a data transmission interface 101, a buffer 103, a flash memory A (105), a flash memory B (107), a flash memory C (109), a flash memory controller A (111), a flash memory controller B (113), a flash memory controller C (115), a mirror means A (117), a mirror means B (119), a mirror means C (121), a processor 123 and a bus 125. When the data access apparatus 100 wants to write data into the flash memory A, B, C (105, 107, 109), the processor 123 receives data (e.g. receives data from a server or a host) via the data transmission interface 101 and stores the data into the buffer 103 via the bus 125. Then, the flash memory controller A, B, C (111, 113, 115) copies the data stored in the buffer 103 and writes the data into the flash memory A, B, C (105, 107, 109) via the bus 125.

The flash memories A-C (105-109) include data regions 127-131 and mirror regions 133-137, respectively. The flash memory controller A, B, C (111, 113, 115) copies the data stored in the buffer 103 and writes the data into the data region 127, 129, 131 of the flash memory A, B, C (105, 107, 109). When the flash memory controller A, B, C (111, 113, 115) writes the data into the data region 127, 129, 131, the mirror means A, B, C (117, 119, 121) copies the data to form mirror data and stores the mirror data into the mirror region 133, 135, 137, and the flash memory controller A, B, C (111, 113, 115) determines whether the data are correct according to the ECC corresponding to the data while the data are being read. When the data are not correct, the flash memory controller A, B, C (111, 113, 115) reads the mirror data corresponding to the data, and determines whether the mirror data are correct according to an ECC corresponding to the mirror data (or the mirror data can be recovered to correct data by the ECC). When the mirror data are correct, the flash memory controller A, B, C (111, 113, 115) transmits the mirror data, instead of the data, to the host or the server. In detail, the flash memory controller A, B, C (111, 113, 115) reads the mirror data to replace the data if the number of errors of the data is more than a reparable amount (e.g. larger than the number of error bits that ECC can correct) while the data are being read.

The above-mentioned mirror means A, B, C (117, 119, 121) can be implemented by software, firmware or hardware. In addition, the flash memory A, B, C (105, 107, 109) can include a plurality of data regions and a plurality of mirror regions, and the flash memory controller can perform data partitioning and then data mirroring, or perform data mirroring and then data partitioning to process the data to be written into the flash memory.

In detail, the method of performing data partitioning and then data mirroring is that, when the flash memory controller A, B, C (111, 113, 115) writes data into the flash memory A, B, C (105, 107, 109), the flash memory controller A, B, C (111, 113, 115) partitions the data into a plurality of parts and writes the parts into the data region 127, 129, 131, and the mirror means A, B, C (117, 119, 121) copies the parts of the data and then stores them into the mirror region 133, 135, 137. The method of performing data mirroring and then data partitioning is that, the mirror means A, B, C (117, 119, 121) copies data to form mirror data, and then the flash memory controller A, B, C (111, 113, 115) partitions the mirror data into a plurality of parts and stores them in the mirror region 133, 135, 137. No matter whether a single data region and single mirror region or multiple data regions and multiple mirror regions are used, an address table needs to be established during data writing to provide lookup and reference for following data reading. As a person skilled in the art can readily understand the functionality and related operations of the address table, further description is omitted here for brevity.

Figure 2:
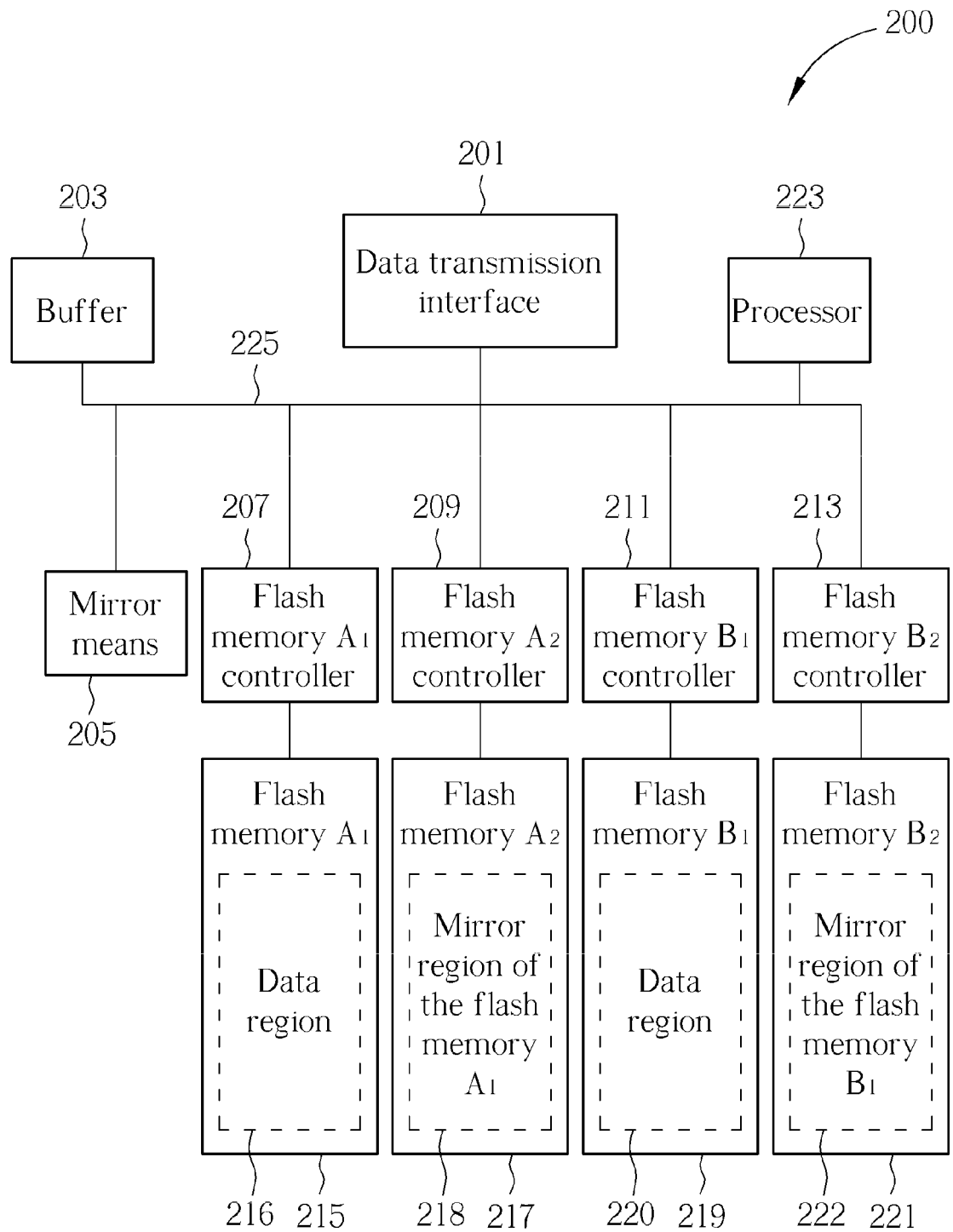
FIG. 2 is a diagram illustrating a data access apparatus according to another exemplary embodiment of the present invention.

FIG. 2 is a diagram illustrating a data access apparatus 200 according to an exemplary embodiment of the present invention. The data access apparatus 200 includes a data transmission interface 201, a buffer 203, a mirror means 205, a flash memory $A_1$ controller (207), a flash memory $A_2$ controller (209), a flash memory $B_1$ controller (211), a flash memory $B_2$ controller (213), a flash memory $A_1$ (215), a flash memory $A_2$ (217), a flash memory $B_1$ (219), a flash memory $B_2$ (221), a processor 223 and a bus 225. The difference between the data access apparatus 200 shown in FIG. 2 and the data access apparatus 100 shown in FIG. 1 is that the data region and the corresponding mirror region of the data access apparatus 100 are implemented in the same flash memory, but the data region and the corresponding mirror region of the data access apparatus 200 are implemented in different flash memories.

For example, a data region 216 of the flash memory $A_1$ (215) is implemented in the flash memory $A_1$ (215), but a mirror region 218 of the flash memory $A_1$ (215) is implemented in the flash memory $A_2$ (217). Similarly, a data region 220 of the flash memory $B_1$ (219) is implemented in the flash memory $B_1$ (219), and a mirror region 222 of the flash memory $B_1$ (219) is implemented in the flash memory $B_2$ (221). The storage spaces of the flash memory $A_2$ (217) and the flash memory $B_2$ (221) can be fully or partial occupied by the mirror region 218 of the flash memory $A_1$ (215) and the mirror region 222 of the flash memory $B_1$ (219), respectively. That is, the size of the mirror region can be part of the available space of the flash memory or equal to the whole available space of the flash memory.

Please note that the components, number of components, and the structure of the above-mentioned data access apparatus 100, 200 are merely for illustrative purposes, and should not be considered as limitations to the scope of the present invention. For example, each of the flash memories in the data access apparatus 100, 200 cooperates with a flash memory controller, but the different flash memories, in fact, can also share the same flash memory controller. Moreover, each of the flash memories in the data access apparatus 100 cooperates with a mirror means, and all of the flash memories in the data access apparatus 200 cooperate with only one mirror means; however, the arrangements of the data access apparatuses 100, 200 are merely examples for illustration, and should not be considered as limitations to the scope of the present invention.

Figure 3:
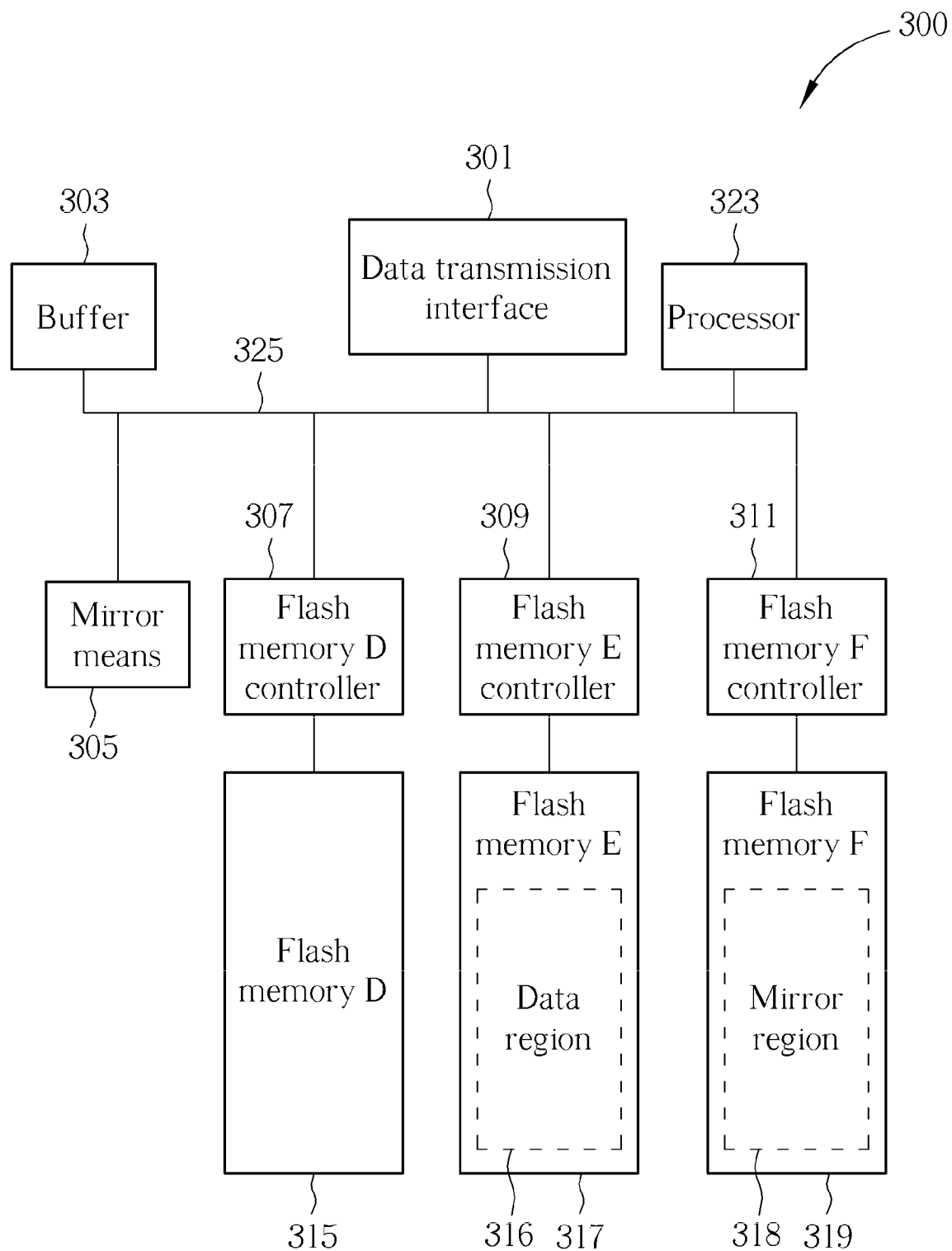
FIG. 3 is a diagram illustrating a data access apparatus according to yet another exemplary embodiment of the present invention.

FIG. 3 is a diagram illustrating a data access apparatus 300 according to an exemplary embodiment of the present invention. The data access apparatus 300 includes a data transmission interface 301, a buffer 303, a mirror means 305, a flash memory D controller (307), a flash memory E controller (309), a flash memory F controller (311), a flash memory D (315), a flash memory E (317), a flash memory F (319), a processor 323 and a bus 325. In this embodiment, the flash memory D (315) is a higher-quality flash memory, such as a single level cell (SLC) flash memory, which has lower access error probability. The flash memory E (317) is a poorer-quality flash memory, such as a multi level cell (MLC) flash memory or a downgrade memory, which has higher access error probability.

In this embodiment, the mirror means 305 selectively performs a mirror process upon the data to be stored into the data access apparatus 300. For example, when a host (not shown in FIG. 3) wants to store data d into the data access apparatus 300, the processor 323 determines that the data d should be stored in the flash memory D (315) according to a logic address $LA_d$ corresponding to the data d, and the mirror means 305 does not perform a mirror process upon the data d because the flash memory D (315) is a higher-quality flash memory with lower access error probability. When the host wants to store data e into the data access apparatus 300, the processor 323 determines that the data e should be stored in a data region 316 of the flash memory E (317) according to a logic address $LA_e$ corresponding to the data e, and the mirror means 305 performs a mirror process upon the data e because the flash memory E (317) is a poorer-quality flash memory with higher access error probability. The mirror means 305 will copy the data e to form mirror data e' and store the mirror data e' into a mirror region 318 of the flash memory F (319).

Please note that the data e and the mirror data e' can be stored in the corresponding physical addresses of the flash memory E (317) and the flash memory F (319), respectively, in an embodiment of the present invention. For example, the data e are stored in a physical address 0x0001 of the flash memory E (317), and the mirror data e' are stored in a physical address 0x0001 of the flash memory F (319). Thus, when the data stored in the physical address 0x0001 of the flash memory E (317) have a read error, the flash memory E controller (309) reports the read error to the processor 323, and then the processor 323 can directly control the flash memory F controller (311) to read the mirror data e' stored in the physical address 0x0001 of the F flash memory 319 without looking up the physical address of the mirror data e'. In this way, the processing speed can be improved. However, this embodiment is not a limitation of the present invention. The physical addresses of the data e and the mirror data e' can also be stored in a look-up table, and the physical address of the mirror data e' (physical address of the data e) can be found through the look-up table and the physical address of the data e (physical address of the mirror data e').

In another embodiment, when a host wants to store data d into the data access apparatus 300, the processor 323 determines that the data d should be stored in the flash memory D (315) according to a logic address $LA_d$ corresponding to the data d. The flash memory D controller (307) determines that the data d should be stored in a physical address $PA_d$ of the flash memory D (315) according to the logic address $LA_d$. The flash memory D controller (307) determines that the physical address $PA_d$ is at a physical storage unit with higher access error probability. For example, the physical storage unit (e.g., a block, a page, etc) had at least a recoverable access error (ECC error) during previous accessing operation. The erroneous bits of the recoverable ECC error are approximated to an upper-bound of the ECC correction capability (or exceed a threshold value). By way of example, the upper-bound of the ECC correction capability is 8 bits, and an access error with 6 erroneous bits has occurred in the storage unit in the past. In order to prevent the non-recoverable ECC errors from occurring in the storage unit, the flash memory D controller (307) reports this situation to the processor 323, and then the processor 323 controls the mirror means 305 to copy data d to form mirror data d' and controls the flash memory F controller (311) to store the mirror data d' into the mirror region 318 of the F flash memory 319. The processor 323 can establish a look-up table for defining the relations of the physical addresses of the data d and the mirror data d'. The data mirror operation is similar to the above-mentioned embodiment, so further description is omitted here for brevity.

As a person skilled in the art can readily understand the related data access method after reading the above embodiments, further description is omitted here for brevity.

Due to the data processing as described in the above embodiments, mirror data can persevere in the mirror region to improve the data correctness, thereby solving the problems associated with the prior art.

Those skilled in the art will readily observe that numerous modifications and alterations of the device and method may be made while retaining the teachings of the invention.

What is claimed is:

1. A data access apparatus, comprising:
a processor;
a flash memory controller;
a mirror means;
a first flash memory, including at least one data region;
a second flash memory, including at least one data region, wherein an accessing error probability for the first flash memory is lower than which of the second flash memory; and
a third flash memory, including at least one mirror region for the second flash memory;
wherein when the processor detects data transmitted from external to the data access apparatus is written to the data region of the second flash memory, the mirror means copies the data to form mirror data to the mirror region;
where when the processor detects the data is written to the data region of the first flash memory, the mirror means does not copy the data to form mirror data to the mirror region;
wherein the flash memory controller reads the mirror data to replace the data when the flash memory controller determines that the data include error(s) when the data is read.

2. The data access apparatus of claim 1, wherein the first flash memory is a single level cell (SLC) flash memory, and the second flash memory is a multi level cell (MLC) flash memory.

3. The data access apparatus of claim 1, wherein the mirror means copies a first data to form a first mirror data to the mirror region when the data access apparatus wants to write the first data into a specific storage unit of the first flash memory, where the specific storage unit had an access error having erroneous bits larger than a threshold value.

4. The data access apparatus of claim 3, wherein the threshold value is lower than an error correction capability of the flash memory controller.

5. A data access apparatus, comprising:
a flash memory controller;
a mirror means;
a first flash memory;
a second flash memory, including at least one data region; and
a third flash memory, including at least one mirror region for the second flash memory;
wherein the mirror means copies data to form mirror data to the mirror region when the flash controller writes the data into the second flash memory, and the flash memory controller reads the mirror data to replace the data when the flash memory controller determines that the data include error(s) while the data are being read;
where the mirror means copies a first data to form a first mirror data to the mirror region when the data access apparatus wants to write the first data into a specific storage unit of the first flash memory, where the specific storage unit had an access error having erroneous bits larger than a threshold value.

* * * * *